Sept. 17, 1929.  J. KUBLER  1,728,290
RECTIFIER SYSTEM
Filed Aug. 31, 1921

Inventor
J. Kubler,
By Market & Clark
Attys.

Patented Sept. 17, 1929

1,728,290

UNITED STATES PATENT OFFICE

JOHANN KUBLER, OF BADEN, SWITZERLAND, ASSIGNOR TO AKTIENGESELLSCHAFT BROWN, BOVERI & CIE., OF BADEN, SWITZERLAND

RECTIFIER SYSTEM

Application filed August 31, 1921, Serial No. 497,430, and in Germany May 4, 1916.

My invention relates to improvements in rectifier systems and it has among its objects the provision of improved circuits to so supply alternating current for feeding polyphase rectifiers as to eliminate the harmonic currents incident to the rectification from the alternating-current-supply circuits, and at the same time provide a path for the unimpeded flow of such current required to obtain a substantially smooth direct-current flow.

My invention will be best understood from the accompanying drawing in which

Figure 1:
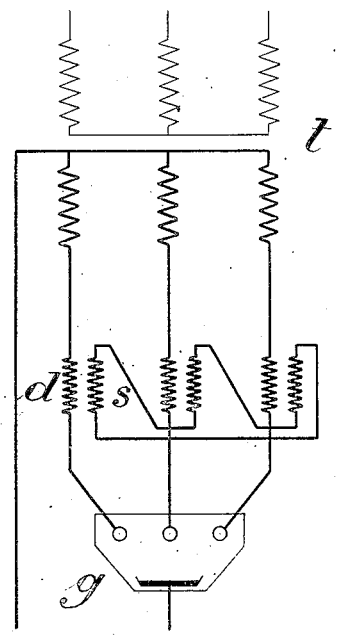
Fig. 1 is a circuit diaphragm of a rectifier system embodying my invention.

In the power rectifiers which are now coming into general use, namely, in mercury-arc rectifiers, or rectifiers of a similar type, rectification is obtained by supplying polyphase alternating current to a rectifier having a cathode and a plurality of anodes co-operating with said cathode. The alternating-current supply connections to the rectifier usually comprise a transformer having a star-connected secondary winding, the phases of said winding being connected to the anodes of the rectifier, and the star terminal of said winding constituting one direct current terminal. The cathode of the rectifier constitutes the other direct-current terminal.

As is well known, rectification results from the fact that, as the several anodes of the rectifier successively, during each alternating-current cycle, reach the highest potential with respect to the cathode, each anode permits periodical current flow during the portion of the cycle where it is at the highest potential, carrying substantially no current during the remainder of the cycle. The direct current which is thus derived from the rectifier constitutes therefore a succession of current elements derived from the successive phases of the rectifier and transformer. Thus, for example, in case of a six-phase rectifier, each anode, and the transformer phase winding supplying the same, passes current only during about the sixth part of an alternating current period. Accordingly, even if a substantially pure sine-wave source of current were available for supplying in the rectifier phases, the current flowing into the rectifier will not be a pure sine-wave current, because the individual supply phases carry currents only during a fraction of the sine-wave cycle. As a result, the current flowing into the rectifier has relatively large higher harmonic components having a frequency which is a multiple of the frequency of the supply source. The most prominent harmonics have a frequency which are multiples of the number of rectifier phases times the frequency of the supply current.

With the usual commercial circuits it is always undesirable to have circulation of harmonic currents in the supply lines, and accordingly, special means are provided for preventing the flow of said harmonic currents into the line. It is clear, however, that to the extent to which said higher harmonics are prevented from circulating in the rectifier circuit, the means preventing said circulation will develop a voltage drop tending to reduce the rectifier voltage.

Thus, in the usual installations choke coils are connected in series with the anodes of the rectifier, the choke coils tending to damp the flow of higher harmonics in direct ratio with the increase of the frequency of the same. Consequently, the higher harmonics, the development of which is desirable for securing proper rectification, will be choked out, giving rise to a magnified voltage drop in the choke coils.

According to my invention I secure an unimpeded flow of the higher harmonic currents without introducing said harmonics into the supply circuits, and substantially without incurring any appreciable voltage drop in the serially-connected anode choke-coil means of the rectifier, by providing a short-circuit path in shunt of the anode connections of the rectifier permitting an unimpeded circulation of said higher harmonic currents without, at the same time, short-circuiting the supply-phases of the rectifier.

To this end a suitable shunt connection is provided between the individual anode circuits to constitute a direct path for the harmonic currents between the individual anodes without having to pass into the supply line, or into the transformer windings which supply the rectifier. In the simplest embodiment of the invention, such shunt path for the flow of the harmonic currents may be obtained by providing each of the anode choke coils, usually connected between the anodes and the respective secondary-transformer windings, with an auxiliary winding element associated with the choke coil like a secondary transformer winding, and connecting these auxiliary secondary winding elements into a closed polygonal circuit having as many sides as there are anode-supply phases, namely, in case of three, five or six-phase currents, etc., into a triangular, pentagonal, hexagonal, nonagonal, etc. closed circuit. Since the higher harmonics induced in said auxiliary secondary winding elements by the choke coils, which constitute associated primary windings, are all of the same phase, and the auxiliary secondary winding elements are so connected into the closed circuit that the harmonic voltage components induced therein all act in the same direction, the polygonal circuits will constitute a short circuit for the higher harmonics permitting substantially unimpeded flow thereof in shunt to the anodes without having to flow into the secondary windings of the supply transformer. The auxiliary-winding elements thus constitute a direct short circuit for each of the anode choke coils in so far as the harmonic currents are concerned, and accordingly, the flow of said harmonic currents in the anode circuits will not produce a voltage drop across the choke coils, thereby eliminating the undesirable voltage variation across the rectifier supply incident to the prior-art arrangement having no harmonic current path in shunt to the anodes of the rectifier.

An arrangement of such character is shown in Fig. 1 in which a mercury-arc rectifier $g$ has three anodes, 1, 2, 3, co-operating with a mercury-arc cathode 4, to rectify alternating current that is supplied to the rectifier by means of a transformer $t$ having secondary phase windings 6, 7, 8, connected in star between a neutral terminal 9, and the anodes of the rectifier, respectively.

The circuit connections between the secondary supply-transformer windings 6, 7, 8, and the rectifier anodes 1, 2, 3, include a set of choke coils $d_1, d_2, d_3$, having auxiliary secondary winding elements $s_1, s_2, s_3$ that are connected into a closed polygon. The several auxiliary winding elements $s_1, s_2, s_3$, are so connected that the voltages induced therein by harmonic components incident to the periodical flow of current through the anodes of the rectifier are added to each other, causing substantially unimpeded flow of said harmonic currents in shunt to the transformer windings, as explained hereinabove. The cathode 4 and the star terminal 9 of the rectifier circuit will then supply a practically smooth direct current, while the current derived from the alternating current network and the transformer $t$ will be free from any appreciable amount of harmonic currents, and at the same time, free circulation of said currents will be obtained in the anode circuits of the rectifier.

Figure 2:
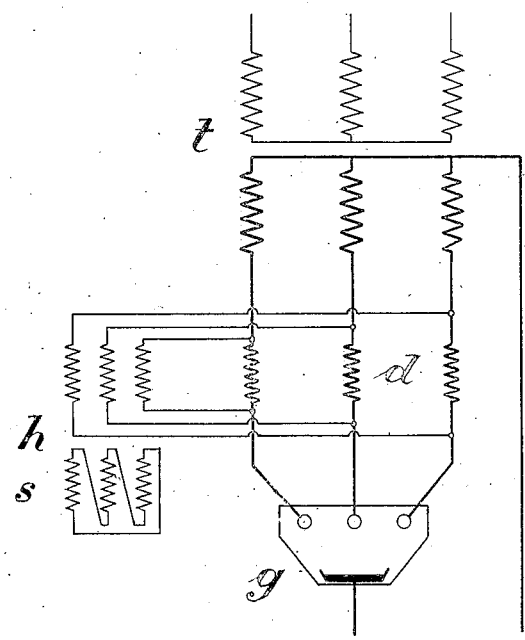
Fig. 2 is a diagram similar to Fig. 1 illustrating another form of my invention.

Instead of providing the choke coils with secondary windings, as shown in Fig. 1, I may, as shown in Fig. 2, provide auxiliary transformer means $h$, having primary windings $u_1, u_2, u_3$, connected across the terminals of the choke coils $d_1, d_2, d_3$, and secondary windings $s_1, s_2, s_3$, associated with said primary windings of the auxiliary-transformer means in a manner similar to the arrangement shown in Fig. 1.

In general, other arrangements will suggest themselves to those skilled in the art for carrying out the objects of my invention, in a manner best suited for the particular type of rectifiers. If, for instance, the rectifier is supplied with two or four-phase connections, and a polygonal circuit for such phase connections would serve no purpose, a suitable path for the free circulation of the harmonic currents under elimination of the additional voltage drop in the series choke coils may be obtained by suitable multiplication of the transformer phases in a familiar manner and connecting the modified phases so obtained in the way described hereinbefore.

I claim as my invention:

1. In a rectifying system of the character described, rectifying apparatus having a plurality of anodes, means providing an alternating-current supply source therefor, means providing an operative connection between said apparatus and such source, choke-coil means disposed in and forming part of said connecting means, and means associated with and responsive to current fluctuation in said choke-coil means and including winding elements electrically isolated with respect to said connecting means and connected into a closed polygonal circuit having as many sides as there are anode-supply phases for said rectifying apparatus.

2. In a rectifying system of the character described, rectifying apparatus having a plurality of anodes, means providing an alternating-current supply source therefor, means providing an operative connection between said apparatus and such source, choke-coils forming part of said connecting means and connected respectively to said anodes, and winding elements inductively related respectively to said choke-coils and connected into a closed polygonal circuit having as many sides as there are anode-supply phases for said rectifying apparatus.

In testimony whereof I have signed my name to this specification.

JOHANN KUBLER.